US006921198B2

(12) United States Patent
Gruszecki et al.

(10) Patent No.: US 6,921,198 B2
(45) Date of Patent: Jul. 26, 2005

(54) PATIENT TEMPERATURE REPEATING SYSTEM AND METHOD

(75) Inventors: Gary A. Gruszecki, Golden, CO (US); Gary A. Carson, Golden, CO (US); Robert W. Proctor, Lakewood, CO (US)

(73) Assignee: Medivance Incorporated, Louisville, CO (US)

( * ) Notice: Subject to any disclaimer, the term of this patent is extended or adjusted under 35 U.S.C. 154(b) by 0 days.

(21) Appl. No.: 10/460,069

(22) Filed: Jun. 12, 2003

(65) Prior Publication Data

US 2004/0252750 A1 Dec. 16, 2004

(51) Int. Cl.[7] .......................... G01K 7/00; G01K 15/00
(52) U.S. Cl. ......................... 374/168; 374/183; 374/1; 374/173
(58) Field of Search ................. 374/173, 172, 374/169, 168, 185, 183, 163, 170, 171, 1; 600/549

(56) References Cited

U.S. PATENT DOCUMENTS

| | | | | |
|---|---|---|---|---|
| 3,822,598 A | | 7/1974 | Brothers et al. | 73/362 |
| 3,872,726 A | | 3/1975 | Kauffeld et al. | 73/362 |
| 3,872,728 A | * | 3/1975 | Joyce et al. | 374/185 |
| 3,897,685 A | | 8/1975 | Beguin et al. | 73/362 |
| 3,978,325 A | | 8/1976 | Goldstein et al. | 235/151.3 |
| 4,022,063 A | * | 5/1977 | West et al. | 374/158 |
| 4,030,363 A | | 6/1977 | Halleck | 73/362 |
| 4,117,723 A | | 10/1978 | Maravich | 73/362 |
| 4,122,719 A | * | 10/1978 | Carlson et al. | 374/172 |
| 4,198,676 A | | 4/1980 | Varnum et al. | 364/557 |
| 4,207,536 A | * | 6/1980 | Lewis | 330/69 |
| 4,232,682 A | | 11/1980 | Veth | 128/671 |
| 4,317,367 A | * | 3/1982 | Schonberger | 374/185 |
| 4,403,296 A | | 9/1983 | Prosky | 364/573 |
| 4,475,823 A | * | 10/1984 | Stone | 374/168 |
| 4,481,596 A | * | 11/1984 | Townzen | 374/172 |
| 4,493,564 A | | 1/1985 | Epstein | 374/179 |

(Continued)

FOREIGN PATENT DOCUMENTS

| | | | | |
|---|---|---|---|---|
| GB | 2183342 A | * | 6/1987 | G01D/3/02 |
| JP | 57077926 A | * | 5/1982 | G01K/7/24 |

*Primary Examiner*—Gail Verbitsky
*Assistant Examiner*—Mirellys Jagan
(74) *Attorney, Agent, or Firm*—Marsh Fischmann & Breyfogle LLP

(57) ABSTRACT

A patient temperature repeating system and a method of repeating patient temperature information from a resistive-type patient temperature sensor allow one or more medical instruments to utilize a single patient temperature sensor. In one embodiment, the patient temperature repeating system (10) includes input and output connectors (12, 14), a microprocessor (20), optical isolators (22), a coarse digital potentiometer (24) in parallel with a fine digital potentiometer (26), a current sense resistor (28), amplifiers (30A, 30B), analog-to-digital converters (32A, 32B), a filter (34), fuses (36), a non-volatile memory device (38), and a relay (40). In operation, the microprocessor (20) reads the resistance level of a resistive-type patient temperature sensor (16) connected to the input connector (12) and provides the appropriate control signals through the optical isolators (22) to the coarse and fine digital potentiometers (24, 26) in order to set the resistance seen by a medical device (18) connected to the output connector (14) to match that of the patient temperature sensor (16).

25 Claims, 7 Drawing Sheets

U.S. PATENT DOCUMENTS

| | | | | |
|---|---|---|---|---|
| 4,516,865 A | * | 5/1985 | Hideo | 374/172 |
| 4,576,487 A | * | 3/1986 | Conover et al. | 374/183 |
| 4,642,785 A | * | 2/1987 | Packard et al. | 374/169 |
| 4,657,015 A | | 4/1987 | Irnich | 128/303.13 |
| 4,669,049 A | | 5/1987 | Kosednar et al. | 364/557 |
| 4,713,783 A | * | 12/1987 | Fletcher | 374/158 |
| 4,728,881 A | * | 3/1988 | Evans et al. | 374/1 |
| 4,741,334 A | | 5/1988 | Irnich | 128/303.13 |
| 4,832,599 A | * | 5/1989 | Kung | 374/185 |
| 4,858,615 A | | 8/1989 | Meinema | 128/668 |
| 5,024,533 A | | 6/1991 | Egawa et al. | 374/126 |
| 5,178,468 A | * | 1/1993 | Shiokawa et al. | 374/185 |
| 5,232,284 A | | 8/1993 | Egawa et al. | 374/126 |
| RE34,507 E | | 1/1994 | Egawa et al. | 374/126 |
| 5,295,746 A | | 3/1994 | Friauf et al. | 374/170 |
| 5,370,121 A | | 12/1994 | Reichenberger et al. | 128/660.02 |
| 5,425,375 A | * | 6/1995 | Chin et al. | 374/142 |
| 5,730,720 A | | 3/1998 | Sites et al. | 604/27 |
| 5,741,074 A | * | 4/1998 | Wang et al. | 374/185 |
| 5,857,777 A | * | 1/1999 | Schuh | 374/172 |
| 6,179,786 B1 | | 1/2001 | Young | 600/549 |
| 6,188,930 B1 | | 2/2001 | Carson | 607/101 |
| 6,232,786 B1 | | 5/2001 | Barnett | 324/691 |
| 6,354,736 B1 | * | 3/2002 | Cole et al. | 374/185 |
| 2002/0091297 A1 | | 7/2002 | Falk | 600/22 |
| 2004/0165646 A1 | * | 8/2004 | Shidemantle et al. | 374/183 |

\* cited by examiner

PATIENT TEMPERATURE REPEATING SYSTEM AND METHOD

FIELD OF THE INVENTION

The present invention relates generally to patient temperature monitoring, and more particularly to providing medical instruments with patient temperature related information from a single patient temperature sensor.

BACKGROUND OF THE INVENTION

Clinicians and other persons involved in providing medical care to patients often wish to use a number of medical instruments and the like that require the use of a patient temperature sensor in order to obtain the temperature of the patient. Often, the patient temperature sensor is a resistive-type sensor (i.e. a sensor that varies its resistance level in accordance with the temperature of a patient on which the sensor is placed such as a thermistor temperature probe). To obtain patient temperature information, a medical instrument supplies an excitation voltage or current to the resistive-type temperature sensor in order to read the resistance level of the sensor. The resistance level of the sensor can then be correlated with patient temperature according to the specifications of the sensor. However, there are a limited number of sites that provide suitable access for such resistive-type patient temperature sensors. Typically, nasopharangeal, bladder, rectal or esophageal sensors are employed to obtain patient temperature. Further, a particular site may provide the best information for a particular therapy. For example, a nasopharangeal sensor may provide the best indication of brain temperature. Thus, a number of medical instruments may have to compete for access to a particular patient temperature monitoring site.

One manner of overcoming the limited number of appropriate temperature sensor sites is to connect a single temperature sensor to multiple medical instruments. However, each medical instrument typically provides its own excitation voltage or current to read the resistance level of the sensor, and the excitation voltage or current of each instrument may be different. Thus, connecting multiple instruments to a single temperature sensor can result in one or more of the instruments obtaining inaccurate patient temperature readings from the sensor.

SUMMARY OF THE INVENTION

Accordingly, the present invention provides a patient temperature repeating system and a method of repeating patient temperature information from a resistive-type patient temperature sensor (e.g., a thermistor, a resistive temperature device, or the like) that allow one or more medical instruments to utilize a single patient temperature sensor. The system and method of the present invention provide for the accessibility of the resistance level of the patient temperature sensor, and hence patient temperature information, by one or more medical instruments without requiring direct connection of the patient temperature sensor with the medical instrument(s). The system and method of the present invention enhance the ability of clinicians to obtain patient temperature information from a single appropriate site in a timely and efficient manner while reducing the potential that the patient temperature sensor might provide inaccurate temperature information to one or more of the medical instruments.

According to one aspect of the present invention, a patient temperature repeating system for repeating a resistance level output by a resistive-type patient temperature sensor includes an input connector, an output connector, a variable resistance device and a controller. The patient temperature repeating system of the present invention provides for the accessibility of the resistance level of the patient temperature sensor by one or more medical instruments without requiring that the patient temperature sensor be directly connected with the medical instrument(s). In this regard, the input connector is configured for connection of the patient temperature sensor thereto and the output connector is configured for connection of one or more medical instruments thereto. The variable resistance device is controllable to provide a variable resistance level to the output connector. The controller is operable to obtain the resistance level provided by a patient temperature sensor connected to the input connector. The controller is also operable to control the variable resistance device to establish the resistance level provided by the variable resistance device to the output connector in accordance with the resistance level obtained from the patient temperature sensor. In this regard, the variable resistance device and the controller may be operable to provide a resistance level to the output connector that equals the resistance level of the patient temperature sensor within an acceptable tolerance level (e.g., +/−4.5 ohms at 42° C., +/−21 ohms at 10° C.).

The variable resistance device may be comprised of a number of different devices. For example, the variable resistance device may comprise one or more potentiometers. In this regard, the variable resistance device may comprise one or more coarse digital potentiometers in parallel with one or more fine digital potentiometers. The coarse potentiometer may, for example, be controllable to provide a resistance level of between 100 (terminal resistance) and 10K ohms in 39 ohm increments and the fine potentiometer may, for example, be controllable to provide a resistance level of between 100 and 10K ohms in 9.8 ohm increments. By way of further example, the variable resistance device may comprise one or more field effect transistors, with the controller being operable to control the gate-source voltage(s) of the field effect transistor(s) to vary drain-source resistance level(s) of the field effect transistor(s). In a further example, the variable resistance device comprises a network of parallel and series fixed resistors and analog switches arranged so that closing different combinations of the switches provides different resistance levels. In another example, the variable resistance device comprises a network of parallel and series fixed resistors and relays arranged so that operating different combinations of the relays provides different resistance levels. In one more example, the variable resistance device comprises an analog potentiometer coupled with a servo motor, with the controller being operable to operate the servo motor to control the resistance level of the analog potentiometer.

The system of the present invention may also include one or more devices (e.g., relays, analog switches, or the like) that are operable to disconnect the variable resistance device from the output connector. This allows the system to present the medical instrument(s) with an open circuit condition to indicate that there has been a failure or that the input temperature sensor has become disconnected. For example, if the controller cannot obtain a resistance level from the patient temperature sensor because the sensor has failed or has become disconnected from the input connector, the relay(s) can be opened. The relay(s) can also be opened if the resistance level obtained by the controller from the patient temperature sensor corresponds with a temperature that is outside a range of temperatures for which the system is calibrated.

In one embodiment of the system of the present invention, the controller may comprise a microprocessor. In this regard, the microprocessor may be operable to periodically obtain the resistance level of the temperature sensor and to periodically establish the resistance level provided by the variable resistance device in accordance with the resistance level periodically obtained from the patient temperature sensor. For example, the microprocessor may obtain the resistance level of the patient temperature sensor and establish the resistance level of the variable resistance device at least once per every second. In other embodiments, the controller may, for example, comprise mapping hardware such as an FPGA, an EPROM or flash memory.

The system may further include a memory for storing information retrievable by the microprocessor for use in controlling the variable resistance device. The system may also include one or more feedback loops for providing information to the microprocessor relating to the resistance level provided by the variable resistance device. The feedback loop may, for example, comprise a first amplifier in series with a first analog-to-digital converter and a second amplifier in series with a second analog-to-digital converter, with the first amplifier amplifying a voltage level across the variable resistance device and the second amplifier amplifying a current through the variable resistance device. It may be desirable to configure the system so that the input connector and the microprocessor are electrically isolated from the variable resistance device, the output connector, the first and second amplifiers and the first and second analog-to-digital converters. In this regard, the desired electrical isolation may be provided by including a plurality of optical isolators, and/or isolation transformers, and/or similar suitable devices in the system. Further, to provide added safety, the system may include a second processor which is connected to the outputs of the first and second amplifiers and processes the information from the feedback loop rather than connecting the feedback loop to the main processor.

According to another aspect of the present invention, a method of repeating a resistance level output by a resistive-type patient temperature sensor includes the step of monitoring the resistance level of the patient temperature sensor. A control signal is generated based on the monitored resistance level. The control signal is then transmitted to a variable resistance device. In response to the control signal, a setting of the variable resistance device is established that provides an output resistance level to a medical instrument which corresponds with the monitored resistance level of the patient temperature sensor. In this regard, the setting of variable resistance device may be established to provide an output resistance that equals the resistance level of the patient temperature sensor within an acceptable tolerance range (e.g., +/−4.5 ohms at 42° C., +/−21 ohms at 10° C.). In one embodiment of the method of the present invention, the steps of monitoring the resistance level of the patient temperature sensor, generating the control signal, transmitting the control signal, and establishing the setting of the variable resistance device are performed on a periodic basis (e.g., at least once every second). Performance of the steps on a periodic basis is particularly suited for implementation of the method using digital components (e.g., a digital microprocessor and digital potentiometers). In other embodiments, the steps of the method may be performed on a continuous basis, such as in an all analog implementation of the method.

In one embodiment, the method of the present invention may also include the additional step of generating a feedback signal from the variable resistance device which is employable for use in the step of generating a control signal. Feedback from the variable resistance device can be used to optimize the control signal as necessary in order to properly establish the setting of the variable resistance device so that the output resistance level more accurately matches the monitored resistance level of the patient temperature sensor. As may be appreciated, feedback is not necessarily required and the method of the present invention can also be implemented with open-loop control of the variable resistance device.

In one embodiment of the method of the present invention, the variable resistance device comprises a coarse potentiometer in parallel with a fine potentiometer. In this regard, the control signal that is generated may be configured to provide for establishing only the setting of the coarse potentiometer, establishing only the setting of the fine potentiometer, or establishing the settings of both the coarse and fine potentiometers. This may be accomplished by generating a control signal that includes a first portion for establishing the setting of the coarse potentiometer and a second portion for establishing the setting of the fine potentiometer.

The step of generating the control signal may involve the step of retrieving stored settings for the coarse and fine potentiometers associated with the monitored resistance level. In this regard, the method of the present invention may also include the steps of performing a calibration process to derive a plurality of settings for the coarse and fine potentiometers associated with a plurality of different monitored resistance levels and storing the settings for later retrieval. The calibration process may be performed for resistance levels corresponding to patient temperatures within a predetermined calibration range (e.g., 10.0 to 42.0 degrees Celsius). As may be appreciated, the resistance levels corresponding to patient temperatures within the predetermined calibration ranges may vary depending upon the model of the patient temperature sensor for which the calibration process is being performed. The calibration process may involve the steps of generating at least one test signal based on a predetermined resistance level, transmitting the test signal to the variable resistance device to establish an initial setting for the variable resistance device, monitoring the resistance level of the variable resistive device, and adjusting the setting of the variable resistance device to identify a final setting for the variable resistance device that provides a resistance level that is within an acceptable tolerance range (e.g., +/−4.5 ohms at 42° C., +/−21 ohms at 10° C.) of the predetermined resistance level.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
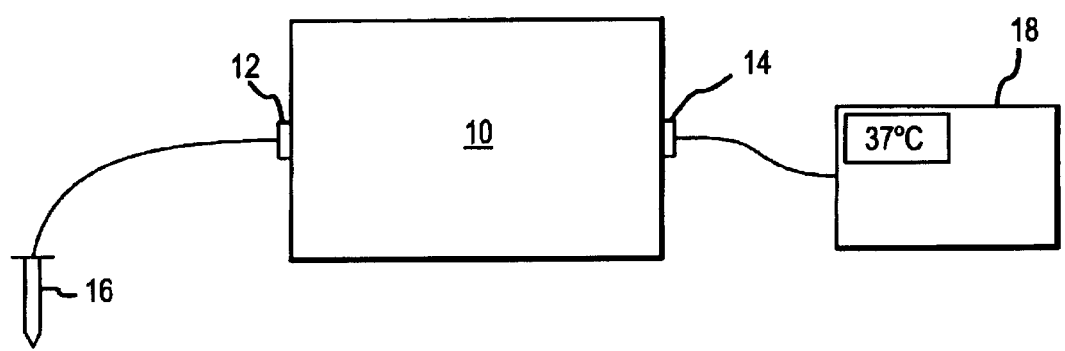
FIG. 1 is a block diagram of one embodiment of a patient temperature repeating system in accordance with the present invention.

Referring to FIG. 1, there is shown a block diagram of one embodiment of a patient temperature repeating system 10. The patient temperature repeating system 10 includes an input connector 12 and an output connector 14. The input connector 12 is configured for connection of a resistive-type temperature sensor 16 to the patient temperature repeating system 10. In this regard, the input connector 12 may be a plug-type connector configured for receiving the plug of, for example, a YSI-400 series thermistor probe available from YSI Incorporated. The output connector 14 is configured for connection of a medical instrument 18 to the patient temperature repeating system 10. In this regard, the output connector 14 may be a plug-type connector for receiving the plug of a cable connected to the medical instrument 18. The output connector 14 permits multiple medical instruments to be easily switched in and out by simply removing the plug connector of one instrument 18 and inserting the plug connector of another instrument 18 into the output connector 14. In other embodiments, the output connector 14 connector may be configured for the simultaneous connection of multiple medical instruments 18 thereto. In this regard, the system 10 may, for example, incorporate multiple repeater circuits (not shown) that enable the simultaneous connection of multiple medical instruments 18.

The patient temperature repeating system 10 receives temperature data at its input connector 12 from the temperature sensor 16 and echoes the received temperature data at its output connector 14. In this regard, the temperature data provided at the input connector 12 may be in the form of a resistance value that is sensed by the temperature sensor 16. The temperature repeating system 10 controls the resistance seen at the output connector 14 to match the resistance sensed by the temperature sensor 16 so that the medical instrument 18 sees the same resistance at the output connector 14 as provided by the temperature sensor 16 at the input connector 12. In this regard, the temperature repeating system 10 matches the resistance sensed by the temperature sensor 16 within an acceptable tolerance range (e.g., +/−4.5 ohms at 42° C., +/−21 ohms at 10° C.). For example, a YSI-400 series thermistor probe might provide a resistance value of 1355 ohms corresponding to a patient temperature of 37 degrees Celsius, and the temperature repeating system 10 controls the resistance seen at its output connector 14 by the medical instrument 18 to be 1355 ohms+/−5.5 ohms. In embodiments where the temperature repeating system 10 includes multiple output connectors 14, the resistance seen at each output connector 14 is controlled to match that provided by the temperature sensor 16 at the input connector 12.

Figure 2:
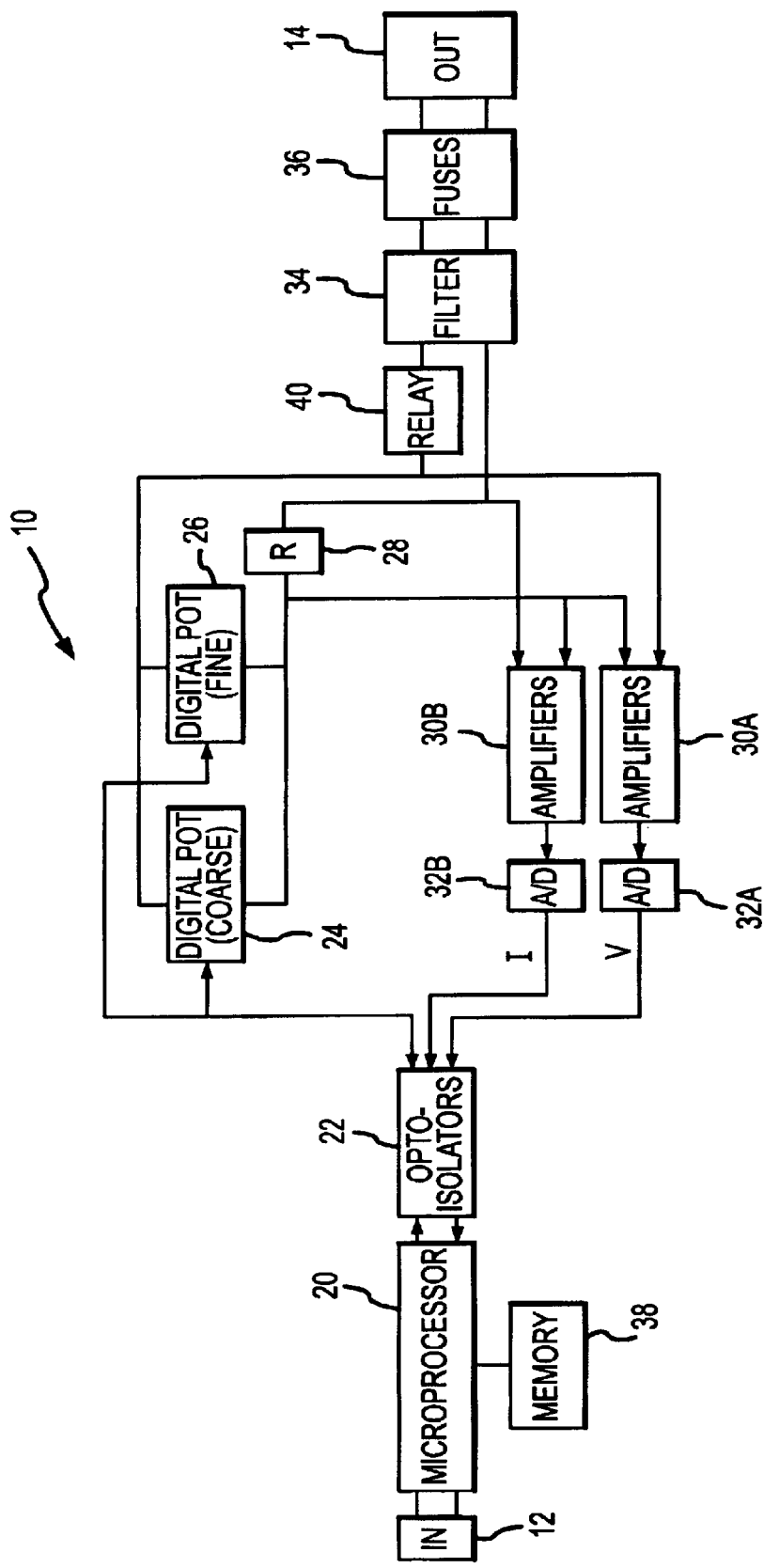
FIG. 2 is a more-detailed block diagram of the patient temperature repeating system.

Referring now to FIG. 2, there is shown a more-detailed block diagram of one embodiment of the temperature repeating system 10. In addition to the input and output connectors 12, 14, the temperature repeating system 10 includes a microprocessor 20, optical isolators 22, a coarse digital potentiometer 24 in a parallel arrangement with a fine digital potentiometer 26, a current sense resistor 28, a pair of amplifiers 30A and 30B, a pair of analog-to-digital (A/D) converters 32A and 32B, a filter 34, fuses 36, and a non-volatile memory device 38 and a relay 40. The microprocessor 20 receives the temperature data from the input connector 12 and provides the appropriate control signals through the optical isolators 22 to the coarse and fine digital potentiometers 24 and 26 in order to set the resistance seen at the output connector 14 to the appropriate value. In this regard, since the coarse and fine digital potentiometers 24 and 26 are in parallel, the resistance seen at the output connector 14 is given by the following expression for parallel resistance:

$$R_O = \frac{R_C R_F}{R_C + R_F} + R_{CSR} + R_{FILTER}$$

where $R_C$ is the resistance provided by the coarse digital potentiometer 24, $R_F$ is the resistance provided by the fine digital potentiometer 26, $R_{CSR}$ is the resistance provided by the current sense resistor 28, $R_{FILTER}$ is the resistance provided by the filter 34, and $R_O$ is the resistance at the output connector 14. The coarse potentiometer 24 may provide a greater range of resistance value settings in larger steps than provided by the fine potentiometer 26. For example, the coarse potentiometer 24 may provide resistance values from 100 ohms to 10K ohms in 39 ohm steps, whereas the fine potentiometer may provide resistance values from 100 ohms to 10K ohms in 9.8 ohm steps. Further, the fine adjustment potentiometer 26 could have a higher base resistance than the coarse digital potentiometer 24 in order to provide a lesser (i.e., finer) effect on the output resistance $R_O$ when the fine digital potentiometer 26 is varied. By way of example, in order to provide an output resistance $R_O$ of 1355 ohms, the coarse digital potentiometer 24 may be set to provide a resistance of 1254.9 ohms and the fine digital potentiometer 26 may be set to provide a resistance of 4692 ohms (assuming $R_{CSR}$ and $R_{FILTER}$ together total about 365 ohms).

The medical instrument 18 may, for example, read the output resistance $R_O$ provided by the parallel potentiometers 24, 26 by supplying a known current signal to the output connector 14 and reading the voltage drop across the terminals of the output connector 14 or by establishing a known voltage drop across the terminals of the output connector 14 and reading the current from one terminal through the parallel potentiometers 24, 26 to the other terminal of the output connector 14. Also, the medical instrument 18 may obtain the output resistance $R_O$ by providing a voltage and resistance to create a divider with the sensor 16.

In addition to being connected through the relay 40, the filter 34 and fuses 36 to the output connector 14, the coarse and fine digital potentiometers 24 and 26 are also connected in a feedback configuration with the microprocessor 20 through the amplifiers 30A, 30B, the A/D converters 32A, 32B and the optical isolators 22. One of the amplifiers 30A amplifies the voltage applied across the parallel potentiometers 24, 26 and the other amplifier 30B amplifies the total current flowing through the parallel potentiometers 24, 26 by measuring the voltage across the current sense resistor 28, a precision resistor. The A/D converters 32A, 32B convert the analog voltage and current signals from the amplifiers 30A, 30B to digitized signals. The digitized voltage and current signals are directed through the optical isolators 22 to the microprocessor 20. Based on the digitized voltage and current signals, the microprocessor 20 determines the output resistance $R_O$ provided by the potentiometers 24, 26. If the output resistance $R_O$ does not adequately match the resistance of the temperature sensor 16, the microprocessor 20 may then adjust the fine digital potentiometers 26 and, if necessary, the coarse digital potentiometer 26 to achieve the desired output resistance $R_O$. Also, the microprocessor 20 may initiate an alert to the user that the repeated sensor resistance value is not valid.

Inclusion of the optical isolators 22 between the microprocessor 20 and the coarse and fine digital potentiometers 24, 26 and the A/D converters 32A and 32B provide several benefits. For example, the optical isolators 22 help prevent the medical instrument 18 from presenting a hazard to the patient or operator through the temperature repeating system 10 as well as ensuring that a ground loop does not distort the simulated output resistance $R_O$. In this regard, a hazard to the operator may, for example, develop if there is a fault in the temperature sensor 16 connected to the input connector 12 whereby main voltage becomes present on the input connector 12 port. The isolation provided by the optical isolators 22 prevents such undesired voltage from coming into contact with the bulk of the electronics in the patient temperature repeating system 10. The relay 40 between the coarse and fine digital potentiometers 24, 26 and the filter 34, the filter 34 between the relay 40 and the fuses 36, and the fuses 36 between the filter 34 and output connector 14 also provide several benefits. For example, the relay 40 is used to disconnect the coarse and fine digital potentiometers 24, 26 from the output connector 14 and thereby present an open circuit condition at the output connector 14 when patient temperature information is outside of the measure range of the temperature sensor 16 or is not available (e.g., the temperature sensor 16 is disconnected from the input connector 12 or is malfunctioning). In this regard, the relay 40 may be a transistor, an analog switch, or other similar devices operable to open or close in response to control signals from the microprocessor 20. The filter 34 and fuses 36, for example, protect the circuitry of the temperature repeating system 10 from external interference and hazards (e.g., excessive current) resulting from operation of the medical instrument 18 connected to the output connector 14.

As may be appreciated, the temperature repeating system 10 may be configured in other manners in addition to the previously described embodiment illustrated in FIG. 2. For example, feedback to the microprocessor 20 regarding the output resistance $R_O$ provided by the potentiometers 24, 26 may not be necessary. In this regard, the amplifiers 30A, 30B and the A/D converters 32A, 32B need not be included in the temperature repeating system 10 and the microprocessor 20 can simply set the potentiometers 24, 26 using open loop control techniques. In other embodiments, the output resistance $R_O$ can be provided by devices other than parallel coarse and fine digital potentiometers. For example, a field effect transistor (FET) may be employed with the drain-source resistance of the FET being varied by controlling the gate-source voltage. Another alternative manner of providing the desired output resistance $R_O$ is a plurality of analog switches (e.g., BJT or FET transistors) and fixed resistors arrayed in parallel and series such that various combinations of "on" switches provides the desired output resistance $R_O$. It is also possible to provide the desired output resistance $R_O$ by adjusting the position of an analog potentiometer using a servo motor or the like. Furthermore, the coarse and fine digital potentiometers 24, 26 might be replaced with a single digital potentiometer. However, due to the resolution limitations of a typical 10-bit digital potentiometer presently available, parallel coarse and fine potentiometers 24, 26 as illustrated in FIG. 2 have the advantage of being able to more accurately match nonlinear resistance characteristics of a typical thermistor over the necessary range.

Figure 3A:
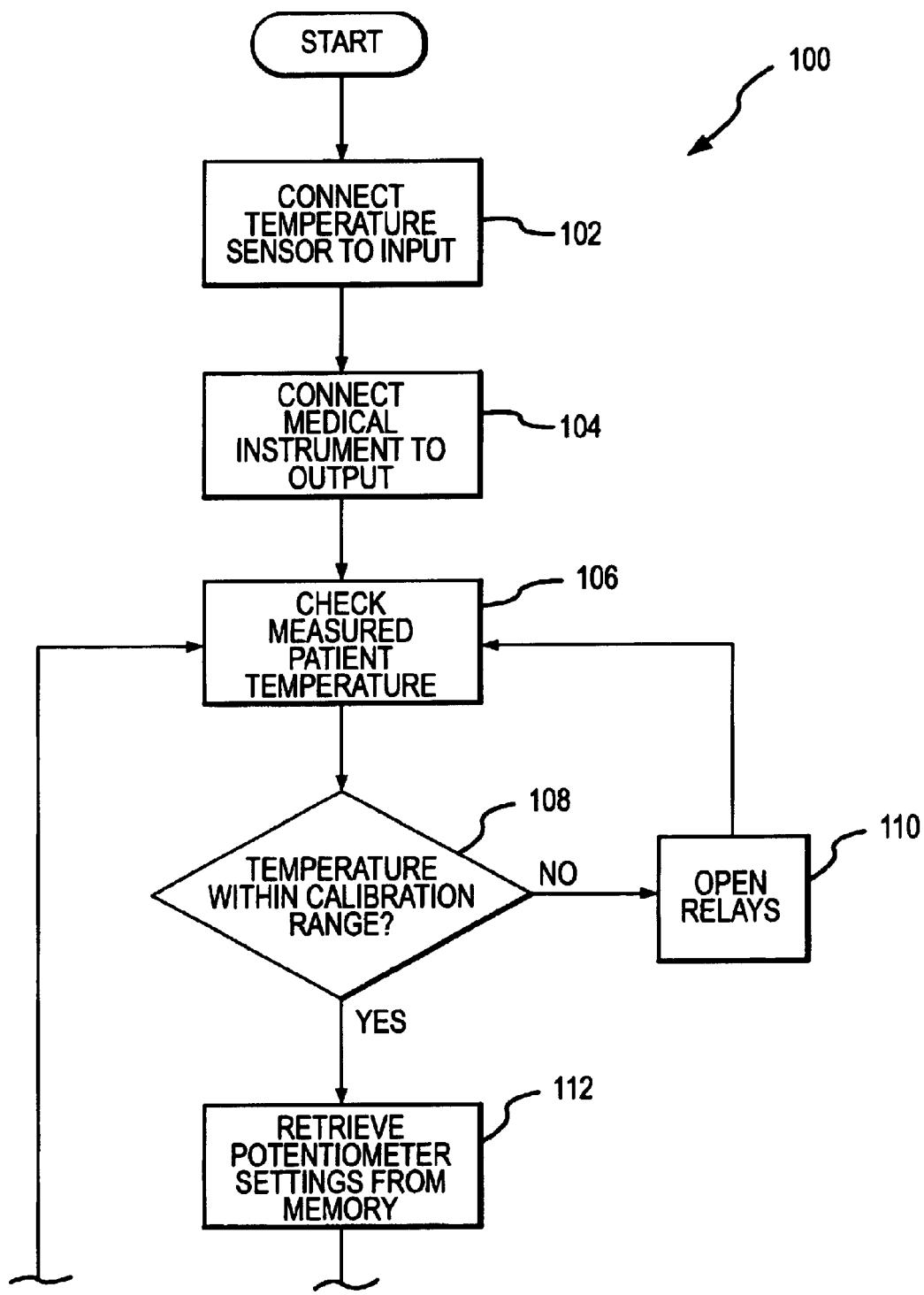
FIGS. 3A–B are a flow chart illustrating one embodiment of a process for operating the patient temperature repeating system.
Figure 3B:
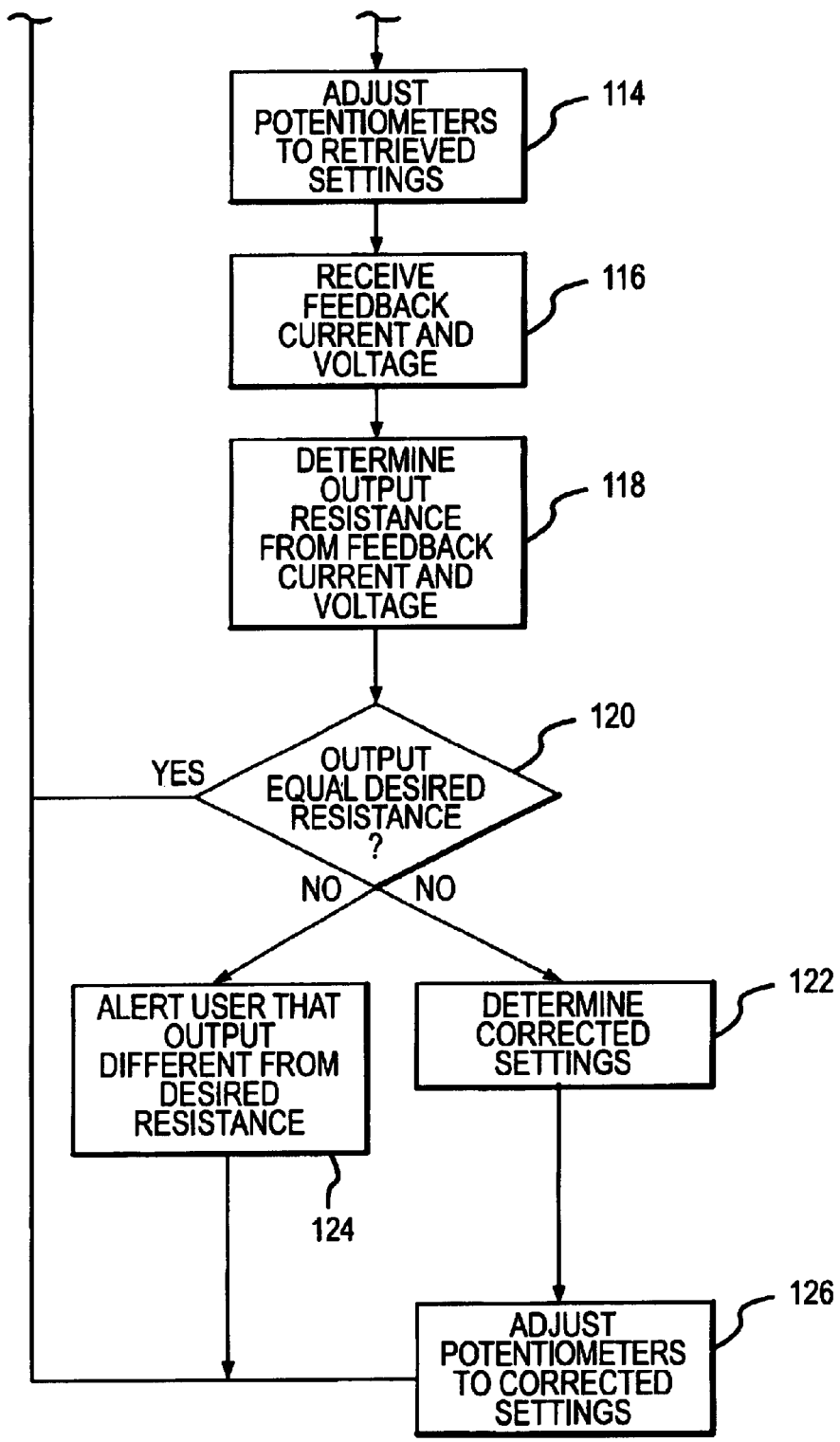

Referring now to FIGS. 3A–B there is shown a flow chart illustrating one embodiment of an operational process (100) for using the temperature repeating system 10 of FIGS. 1 and 2. Prior to using the temperature repeating system 10, it should be calibrated. In this regard, a more cost effective embodiment of the temperature repeating system 10 may be manufactured using lower precision components, however, high accuracy can still be attained through calibration. One manner in which the temperature repeating system 10 may be calibrated is described below in connection with FIGS. 4A–C. Once calibrated, operation of the temperature repeating system 10 begins with connecting (102) a temperature sensor 10 to the input connector 12 and connecting (104) a medical instrument 18 to the output connector 14 of the temperature repeating system 10. The microprocessor 20 then checks (106) the patient temperature measured by the temperature sensor 16. In this regard, the microprocessor 20 may round the measured patient temperature to the nearest 0.1 degrees Celsius. The microprocessor 20 then determines (108) whether the measured patient temperature is within a calibration range of the temperature repeating system 10. If the measured patient temperature is outside of the calibration range, the relay 40 is opened (110) and the process returns to step (106). If the measured temperature is within the calibration range, the microprocessor 20 retrieves (112) the appropriate settings for the coarse and fine potentiometers 24, 26 from the non-volatile memory 38. Settings for the coarse and fine potentiometers 24, 26 corresponding to various temperatures are stored in the non-volatile memory 38 during calibration. The microprocessor 20 then sends appropriate control signals to adjust (114) the coarse and fine potentiometers 24, 26 to the retrieved settings.

After the coarse and fine potentiometers 24, 26 are adjusted to the retrieved settings, the microprocessor receives (116) feedback current and voltage levels from the parallel potentiometers via the amplifiers 30A, 30B and A/D converters 32A, 32B. Using the feedback current and voltage levels, the microprocessor determines (118) the output resistance provided by the parallel potentiometers 24, 26. The output resistance is then compared (120) with the desired resistance corresponding to the measured patient temperature. If the output resistance equals (within the acceptable tolerance range) the desired resistance, the operational process returns to step (106) wherein the microprocessor 20 again checks the patient temperature measured by the temperature sensor 16. If it is determined in step (120) that the output resistance does not equal (within the acceptable tolerance range) the desired resistance, then the microprocessor 20 determines (122) corrected settings for the coarse and fine potentiometers 24, 26 and/or provides an alert to the user (124). In this regard, it will typically only be necessary to correct the setting of the fine potentiometer 26. If corrected settings are determined by the microprocessor 20, the microprocessor 20 then sends appropriate control signals to adjust (126) the coarse and fine potentiometers 24, 26 to the corrected settings, and thereafter the operational process (100) returns to step (106) wherein the microprocessor 20 again checks the patient temperature measured by the temperature sensor 16.

Figure 4A:
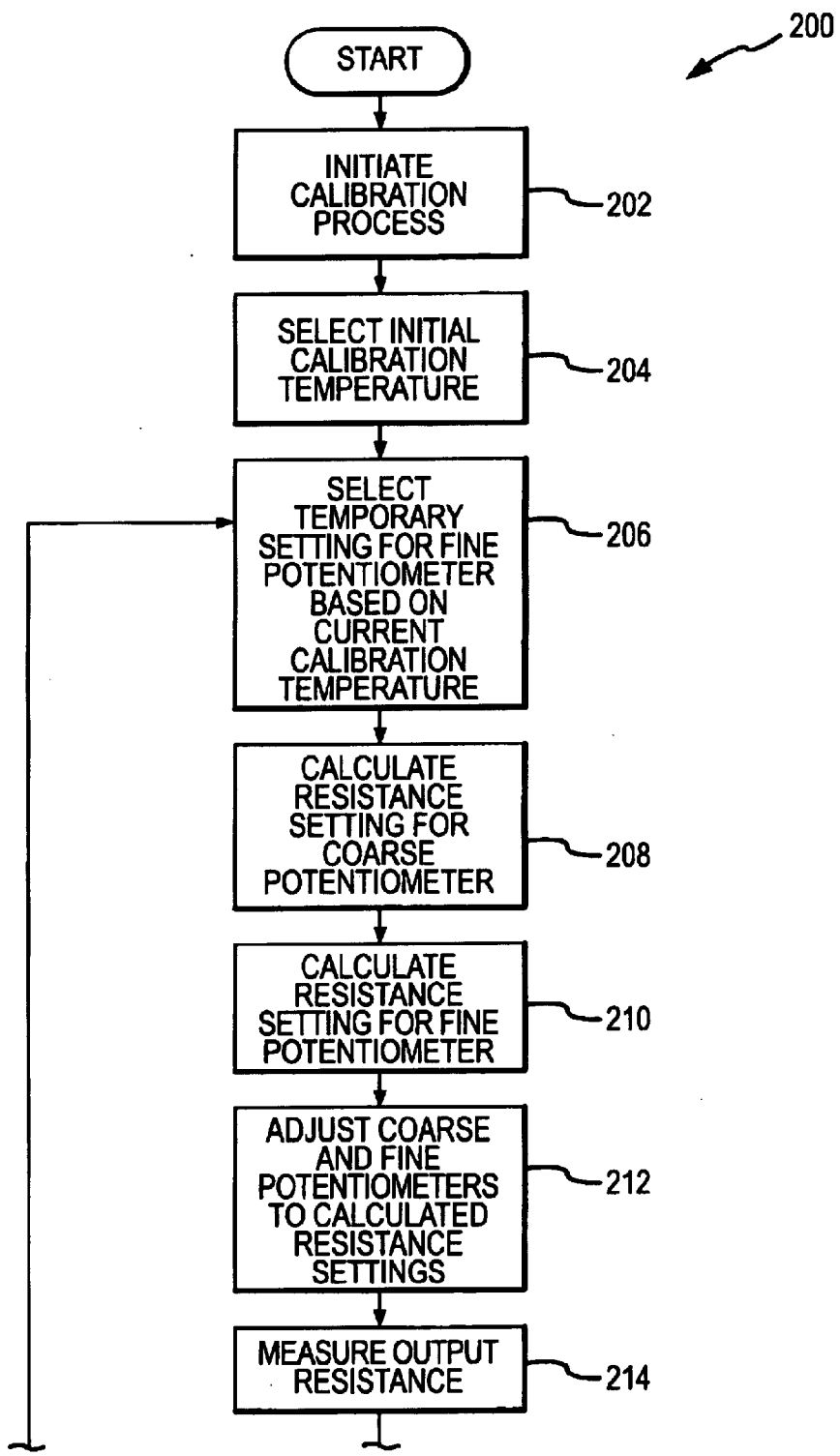
FIGS. 4A–C are a flow chart illustrating one embodiment of a process for calibrating the patient temperature repeating system.
Figure 4B:
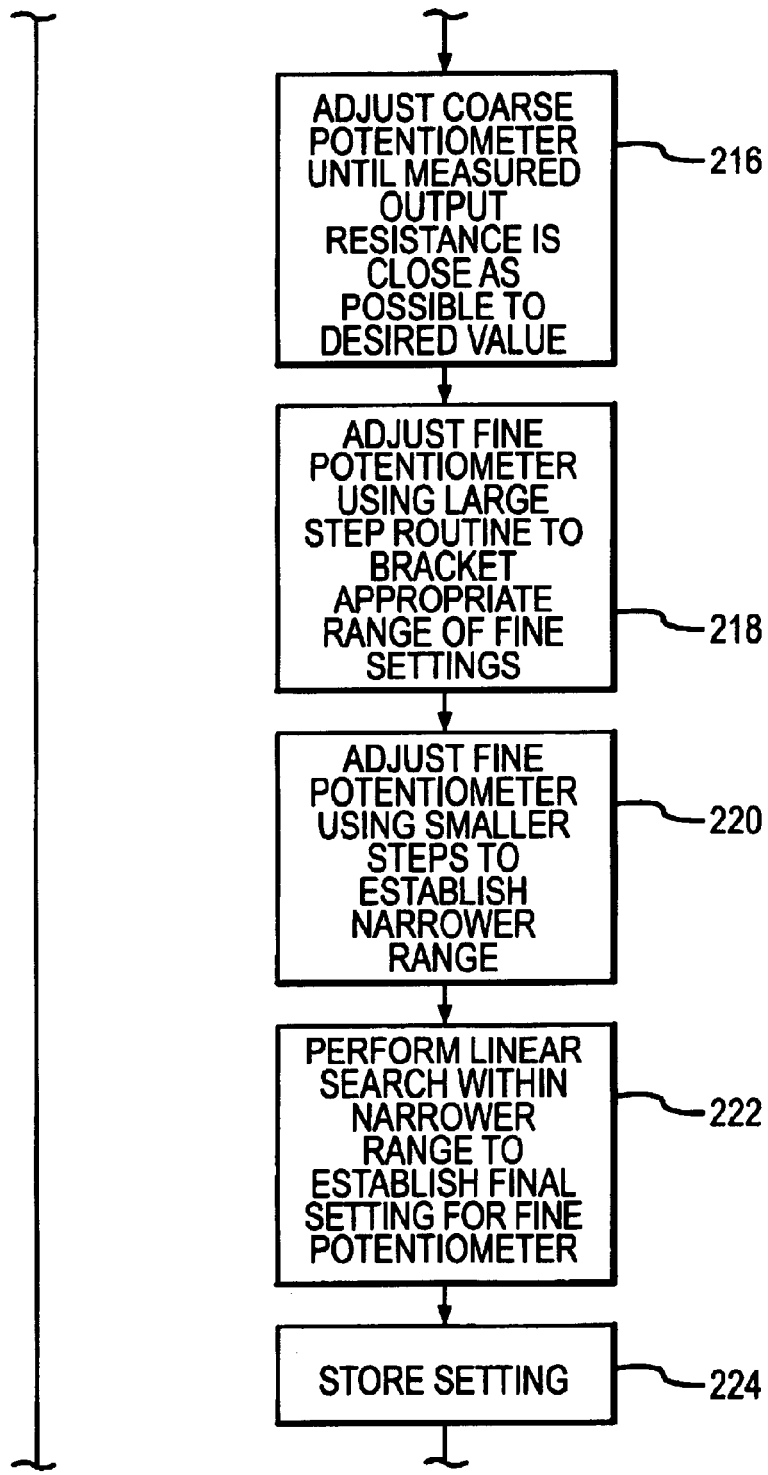
Figure 4C:
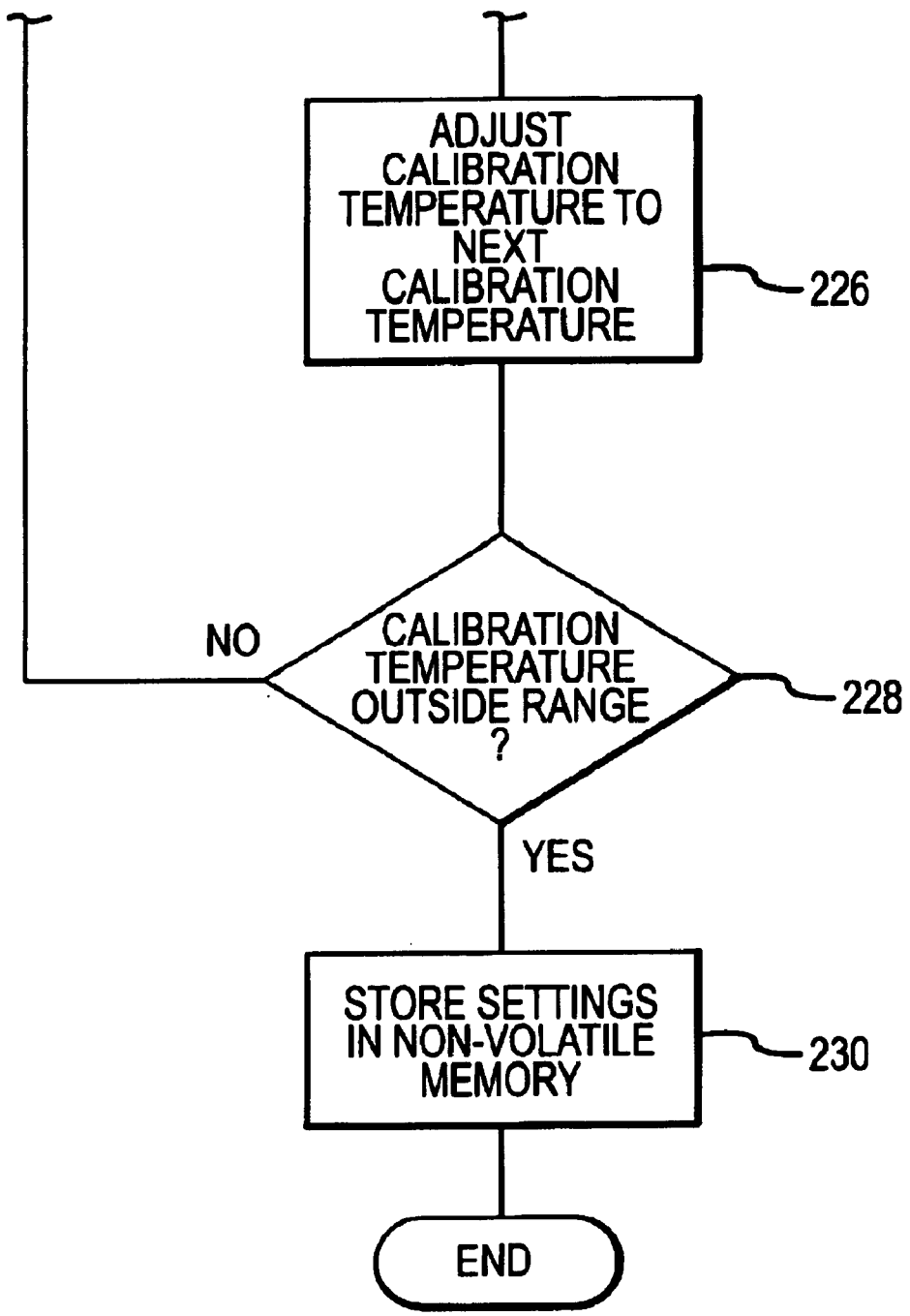

Referring now to FIGS. 4A–C there is shown a flow chart illustrating a calibration process 200 for the temperature repeating system 10 of FIG. 2. The calibration process 200 identifies the appropriate settings for the coarse and fine potentiometers 24, 26 that provide the appropriate resistance values across the terminals of the output connector 14 corresponding with various temperatures within a particular range of calibration temperatures. For example, the calibration process (200) may identify the appropriate settings for every 0.1 degrees Celsius within the range from 10.0 to 42.0 degrees Celsius (i.e., for 10.0, 10.1, 10.2, . . . , 41.8, 41.9, 42.0 degrees Celsius) within an acceptable tolerance level. The settings may, for example, be calibrated to within an acceptable tolerance level of 0.02 degrees Celsius from the desired temperature. The microprocessor 20 may be programmed to perform the calibration process (200), thereby allowing the temperature repeating system 10 to be periodically calibrated in the field. The calibration process (200) is typically performed for a particular model probe or class of probes, as the appropriate resistance values corresponding to different patient temperatures may vary between different probe models or classes.

The calibration process (200) begins with initiating the calibration process (202). The step (202) of initiating the calibration process may involve several sub-steps such as connecting the output connector 14 to the input connector 12 using, for example, a cable having plug connectors on either end, as well as identifying the probe model of class for which calibration is desired. The microprocessor 20 then selects (204) the initial calibration temperature (e.g., 10.0 degrees Celsius for a calibration range of 10.0 to 42.0 degrees Celsius). A temporary resistance value setting for the fine potentiometer 26 is then selected (206) based on the current calibration temperature. If the calibration process (200) has just been initiated, the current calibration temperature will be the initial calibration temperature selected by the microprocessor 20 in the step (204). In step (206), the fine potentiometer 26 may be set to provide one of a number (e.g., six) resistance values depending upon where the current calibration temperature falls in the calibration range. For example, where the calibration range is from 10.0 to 42.0 degrees Celsius, the fine potentiometer 26 may be set to provide resistance values of 8798 ohms for calibration temperatures from 10.0 to 16.9 degrees Celsius, 7820 ohms for calibration temperatures from 17.0 to 22.9 degrees Celsius, 6843 ohms for calibration temperatures from 23.0 to 27.9 degrees Celsius, 5865 ohms for calibration temperatures from 28.0 to 32.9 degrees Celsius, 4888 ohms for calibration temperatures from 33.0 to 39.9 degrees Celsius, and 4399 ohms for calibration temperatures from 40.0 to 42.0 degrees Celsius.

After the temporary resistance value setting for the fine potentiometer 26 is selected in step (206), a resistance value setting for the coarse potentiometer 24 is calculated (208). In this regard, the resistance value setting for the coarse potentiometer 24 may be calculated from the formula for parallel resistance with the temporary setting for the fine potentiometer 26 selected in step (206) and the desired output resistance corresponding to the current calibration temperature as known values. Since the coarse potentiometer 24 will typically not have sufficient resolution in order to set the coarse potentiometer 24 at the exact calculated resistance value, in step (208) the calculated resistance value will typically be rounded to the nearest resistance value achievable with the coarse potentiometer 24. Thereafter, a new resistance value setting is calculated (210) for the fine potentiometer 26. In this regard, the resistance value setting for the fine potentiometer 26 may be calculated from the formula for parallel resistance with the resistance value setting for the coarse potentiometer 26 obtained in step (208) and the desired output resistance corresponding to the current calibration temperature as known values.

After the resistance value settings for the coarse and fine potentiometers 24, 26 are calculated, the coarse and fine potentiometers 24, 26 are adjusted (212) to the calculated resistance value settings. The microprocessor 20 then measures (214) the output resistance provided across the terminals of the output connector 14 and compares the measured output resistance with the desired output resistance corresponding to the current calibration temperature. If the measured output resistance varies from the desired output resistance corresponding to the current calibration temperature more than the acceptable tolerance level, it will typically be necessary to fine tune the settings for the coarse and fine potentiometers 24, 26 until final settings are determined that provide the desired output resistance corresponding to the current calibration temperature (within the acceptable tolerance level).

The fine tuning process may proceed in the following manner. First, the coarse potentiometer 24 is adjusted (216) until the measured output resistance is as near as possible to the desired output resistance given the resolution of the coarse potentiometer 24. For example, if the measured output resistance exceeds the desired output resistance, the setting of the coarse potentiometer 24 may be decreased to the next lower resistance value achievable from the coarse potentiometer in order to provide a measured output resistance that is closer to the desired output resistance, or if the measured output resistance is less than the desired output resistance, the setting of the coarse potentiometer 24 may be increased to the next higher resistance value achievable from the coarse potentiometer in order to provide a measured output resistance that is closer to the desired output resistance. In step (216), a number of settings for the coarse potentiometer 24 may need to be tried until the best setting is identified, and the best setting may turn out to be the setting as calculated in step (208). After the coarse potentiometer 24 is adjusted to an appropriate setting, the fine potentiometer 26 is then adjusted (218) using large steps until a range for the best setting of the fine potentiometer 26 is bracketed. In this regard, an upper limit for the setting of the fine potentiometer 26 may, for example, be established by increasing the fine potentiometer 26 setting in ninety-eight ohm increments from the resistance value calculated in step (210) until the difference between the measured output resistance and the desired output resistance begins increasing. Likewise, a lower limit for the setting of the fine potentiometer 26 may, for example, be established by decreasing the fine potentiometer 26 setting in ninety-eight ohm increments from the resistance value calculated in step (210) until the difference between the measured output resistance and the desired output resistance begins increasing. Next, the fine potentiometer 26 is then adjusted (220) within the range bracketed in step (218) using small steps to establish a narrower range for the best setting of the fine potentiometer 26. In this regard, the fine potentiometer 26 may be adjusted in forty-nine ohm increments between the lower and upper limits established in step (218) to identify new lower and upper limits in a manner similar to step (218). Finally, a final setting for the fine potentiometer 26 is established by performing (222) a linear search between the new lower and upper limits established in step (220).

Once the final resistance value settings corresponding to the current calibration temperature for the coarse and fine potentiometers 24, 26 are identified, the settings for the current calibration temperature are temporarily stored (224). The next step is to adjust (226) the current calibration temperature to the next temperature for which calibration is desired. In this regard, where the initial calibration temperature selected in step (204) is at the bottom of the calibration range, the current calibration temperature may simply be increased by a specified amount (e.g., 0.1 degrees Celsius). It should be appreciated that the next temperature for which calibration is desired may be obtained differently, such as, for example, by decreasing the current calibration temperature where the initial calibration temperature is at the top of the calibration range. The microprocessor 20 then determines (228) whether the current calibration temperature is outside the desired calibration range. If the current calibration temperature is outside the desired calibration range, the temporarily stored settings for the entire range of calibration temperatures are stored (230) for later access during operation of the temperature repeating system 10. In this regard, the settings may be stored in the non-volatile memory device 38. Thereafter, the calibration process (200) is concluded. If the microprocessor 20 determines that the current calibration temperature is within the desired calibration range, steps (206) through (228) are repeated until it is determined in step (228) that the current calibration temperature is outside the desired calibration range.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A system for repeating a resistance level from a patient temperature sensor that varies its resistance level in accordance with patient temperature, said system comprising:

input means for connecting the patient temperature sensor thereto;

output means for connecting at least one medical instrument thereto;

variable resistance means for providing a variable resistance level to said output means, said variable resistance means comprising a coarse potentiometer in parallel with a fine potentiometer; and control means for obtaining the resistance level provided by a patient temperature sensor connected to said input means and establishing the resistance level provided by said variable resistance means to said output means in accordance with the resistance level obtained from the patient temperature sensor.

2. The system of claim 1 wherein said input means comprise a plug connector.

3. The system of claim 1 wherein said output means comprise a plug connector.

4. The system of claim 1 wherein said control means comprise at least one of a microprocessor, a field programmable gate array, an EPROM, and a flash memory.

5. A patient temperature repeating system for repeating a resistance level from a patient temperature sensor that varies its resistance level in accordance with patient temperature, said system comprising:

an input connector configured for connection of the patient temperature sensor thereto;

an output connector configured for connection of at least one medical instrument thereto;

a variable resistance device controllable to provide a variable resistance level to said output connector, said variable resistance device comprising at least one coarse digital potentiometer in parallel with at least one fine digital potentiometer; and a controller operable to obtain the resistance level provided by a patient temperature sensor connected to said input connector, said controller being further operable to control said variable resistance device to establish the resistance level provided by said variable resistance device to said output connector in accordance with the resistance level obtained from the patient temperature sensor.

6. The system of claim 5 wherein the patient temperature sensor comprises a thermistor.

7. The system of claim 5 wherein the patient temperature sensor comprises a resistive temperature device.

8. The system of claim 5 wherein said controller comprises one of a field programmable gate array, an EPROM, and a flash memory.

9. The system of claim 5 wherein said coarse potentiometer is controllable to provide a resistance level of between 100 and 10 K ohms in 39 ohm increments and said fine potentiometer is controllable to provide a resistance level of between 100 and 10 K ohms in 9.8 ohm increments.

10. The system of claim 5 wherein said variable resistance device and said controller are operable to provide a resistance level to said output connector that is within an acceptable tolerance level of the resistance level of the patient temperature sensor.

11. The system of claim 10 wherein the acceptable tolerance level varies from +/− 4.5 ohms at a patient temperature of 42 C. to +/− 21 ohms at a patient temperature of 10 C.

12. The system of claim 5 wherein said controller comprises a microprocessor.

13. The system of claim 12 wherein said microprocessor is operable to periodically obtain the resistance level provided by the temperature sensor to said input connector and to periodically establish the resistance level provided by said variable resistance device to said output connector in accordance with the resistance level periodically obtained from the patient temperature sensor.

14. The system of claim 13 wherein said microprocessor periodically obtains the resistance level of the patient temperature sensor and periodically establishes the resistance level of said variable resistance device at least once per every second.

15. The system of claim 12 further comprising:

a memory configurable to store information retrievable by said microprocessor for use in controlling said variable resistance device.

16. The system of claim 15 further comprising:

at least one feedback loop providing information to said microprocessor relating to the resistance level provided by said variable resistance device.

17. The system of claim 16 wherein said feedback loop comprises a first amplifier in series with a first analog-to-digital converter and a second amplifier in series with a second analog-to-digital converter, said first amplifier amplifying a voltage level across said variable resistance device and said second amplifier amplifying a current through said variable resistance device.

18. The system of claim 16 wherein said input connector and said microprocessor are electrically isolated from said variable resistance device, said output connector, and said feedback loop.

19. The system of claim 18 wherein the electrical isolation is provided by at least one optical isolator.

20. A patient temperature repeating system for repeating a resistance level from a patient temperature sensor that varies its resistance level in accordance with patient temperature, said system comprising:

an input connector configured for connection of the patient temperature sensor thereto;

an output connector configured for connection of at least one medical instrument thereto; a variable resistance device controllable to provide a variable resistance level to said output connector, wherein said variable resistance device comprises at least one coarse digital potentiometer in parallel with at least one fine digital potentiometer; and a controller operable to monitor the resistance level provided by a patient temperature sensor connected to said input connector, said controller being further operable to generate a control signal based on the monitored resistance level and to transmit the control signal to said variable resistance device to establish the resistance level provided by said variable resistance device to said output connector in accordance with the resistance level of the patient temperature sensor.

21. The system of claim 20 wherein said coarse potentiometer is controllable to provide a resistance level of between 100 and 10 K ohms in 39 ohm increments and said fine potentiometer is controllable to provide a resistance level of between 100 and 10 K ohms in 9.8 ohm increments.

22. A patient temperature repeating system for repeating a resistance level from a patient temperature sensor that varies its resistance level in accordance with patient temperature, said system comprising:
- an input connector configured for connection of the patient temperature sensor thereto;
- an output connector configured for connection of at least one medical instrument thereto;
- a variable resistance device controllable to provide a variable resistance level to said output connector;
- a controller operable to monitor the resistance level provided by a patient temperature sensor connected to said input connector, said controller being further operable to generate a control signal based on the monitored resistance level and to transmit the control signal to said variable resistance device to establish the resistance level provided by said variable resistance device to said output connector in accordance with the resistance level of the patient temperature sensor; and
- at least one device operable to disconnect said variable resistance device from said output connector.

23. The system of claim 22 wherein said at least one device operable to disconnect said variable resistance device from said output connector comprises one of a relay and an analog switch.

24. A patient temperature repeating system for repeating a resistance level from a patient temperature sensor that varies its resistance level in accordance with patient temperature, said system comprising:
- an input connector configured for connection of the patient temperature sensor thereto;
- an output connector configured for connection of at least one medical instrument thereto;
- a variable resistance device controllable to provide a variable resistance level to said output connector;
- a controller comprising a microprocessor, said controller being operable to obtain the resistance level provided by a patient temperature sensor connected to said input connector, said controller being further operable to control said variable resistance device to establish the resistance level provided by said variable resistance device to said output connector in accordance with the resistance level obtained from the patient temperature sensor;
- a memory configurable to store information retrievable by said microprocessor for use in controlling said variable resistance device; and
- at least one feedback loop providing information to said microprocessor relating to the resistance level provided by said variable resistance device;
- said input connector and said microprocessor being electrically isolated from said variable resistance device, said output connector, and said feedback loop.

25. The system of claim 24 wherein the electrical isolation is provided by at least one optical isolator.

* * * * *